Sept. 2, 1958     C. E. MILLS     2,849,833
TETHERED MODEL AIRPLANES
Filed Sept. 17, 1956     2 Sheets—Sheet 1
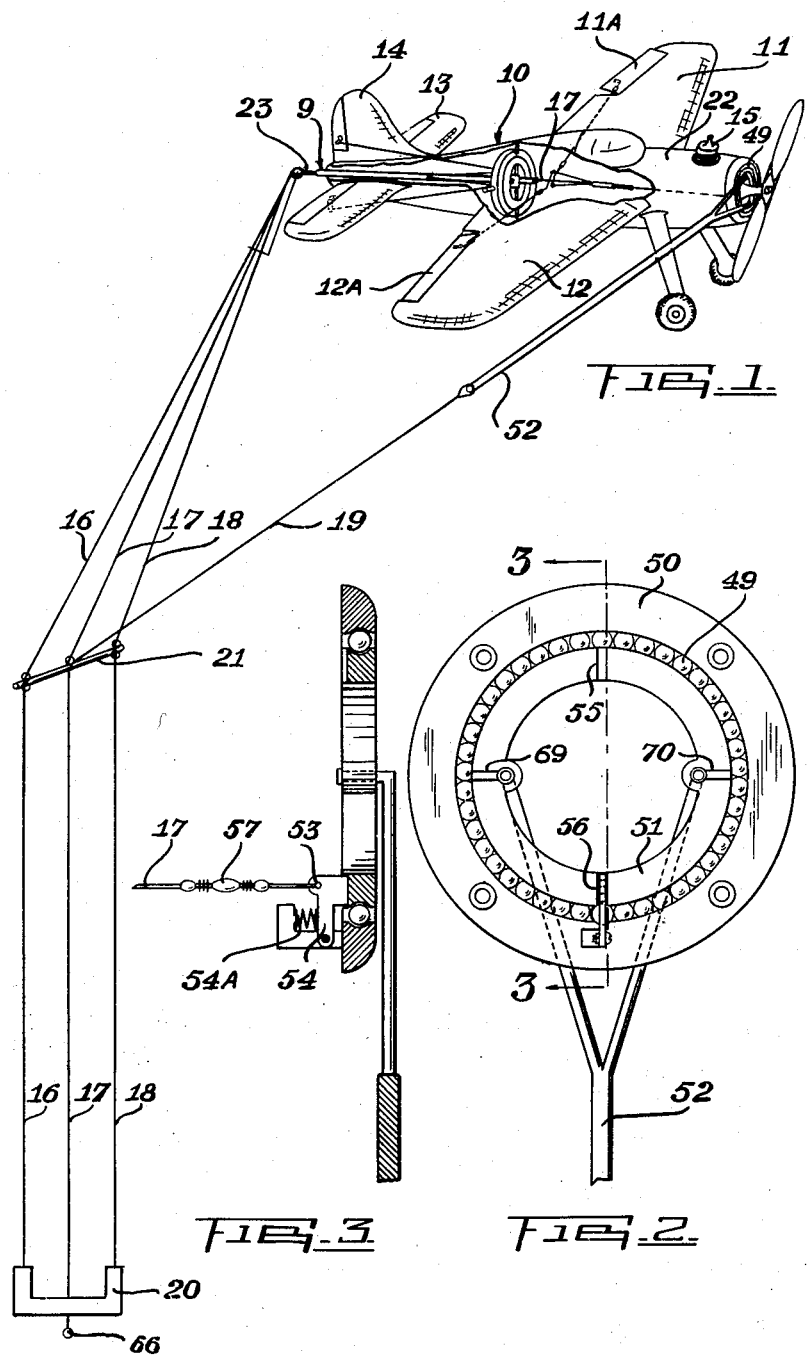
INVENTOR
CLAYTON MILLS
BY Smart + Biggar
ATTORNEYS Sept. 2, 1958  C. E. MILLS  2,849,833
TETHERED MODEL AIRPLANES
Filed Sept. 17, 1956  2 Sheets-Sheet 2
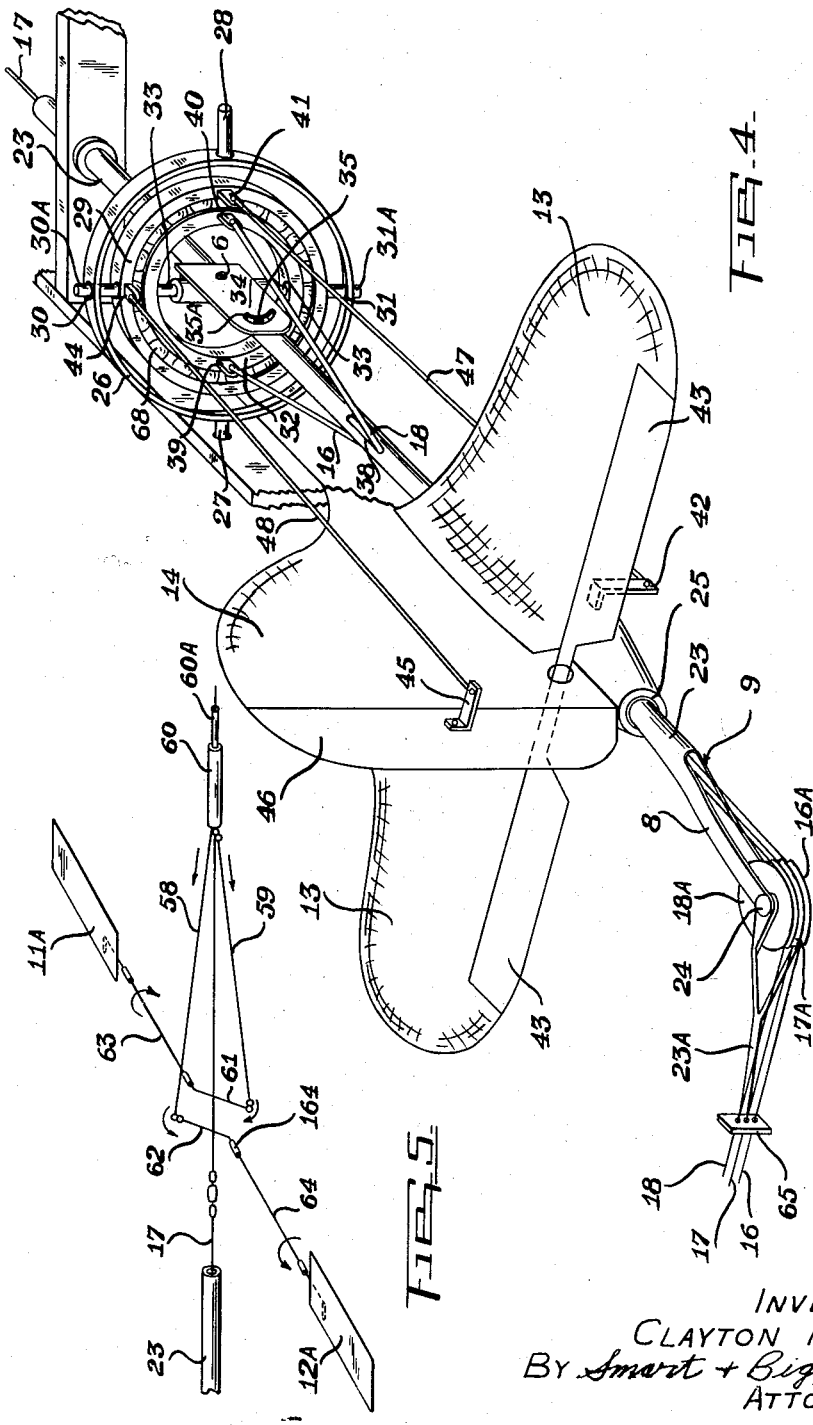
INVENTOR
CLAYTON MILLS
BY Smart + Biggar
ATTORNEYS United States Patent Office 2,849,833
Patented Sept. 2, 1958

1

2,849,833

TETHERED MODEL AIRPLANES

Clayton E. Mills, Cowichan Station, British Columbia, Canada

Application September 17, 1956, Serial No. 610,095

10 Claims. (Cl. 46—77)

This invention relates to control line model aircraft capable of rotating about their directional axis.

Model aircraft which are capable of rotating about their directional axis are known, but they are subject to the great disadvantage that they have two separate independently operable sets of control lines, one for the rudder and elevators and one for the ailerons, which have to be operated together at all times whilst the aircraft is in flight. A great deal of concentration is thus required by the operator, a very slight error on whose part in the control of one or the other of the sets of lines being likely to cause an accident.

It is an object of the present invention to provide means whereby the operator can control the directional and altitudinal control surfaces of the aircraft, the aircraft being meanwhile maintained in a pre-selected banking attitude, attention to the control of which is not required on the part of the operator until he decides to alter the banking attitude of the aircraft.

It is a further object of the present invention to provide a control line model aircraft wherein reversal of the direction of movement of the altitudinal and directional control lines by the operator is not required as the aircraft rolls.

It is yet a further object of the invention to provide a control line model aircraft wherein lateral directional control is automatically transferred from the directional control surfaces to the altitudinal control surfaces and vice versa as the aircraft rotates, the transfer from one or the other being completed on rotation through substantially 90°, and wherein the aircraft may be locked in one of a number of preferred attitudes of rotation about its directional axis with its ailerons being rendered inoperative at the desire of the operator.

A control line model aircraft is confined to its substantially circular flight path by the remote control lines and in order to keep these lines taut the controls of the aircraft must be so adjusted that the craft tends to fly out of (i. e. at a tangent to) the circular flight path. In ordinary control line model aircraft, this effect is achieved by weighting the wing remote from the operator and by setting the rudder to steer the plane outwardly of its flight path. This arrangement is not suitable, however, for control line model aircraft capable of rotating about their directional axis because the weighting of one wing would upset the balance of the aircraft and the setting of the rudder to steer the plane outwardly of its flight path would have the reverse effect in the upside down position.

According to the present invention the pre-setting of the rudder to the extent required to cause the aircraft to fly out of its circular flight path is automatically maintained on that control surface which at the moment is controlling lateral direction.

It is a still further object of this invention to provide means whereby the remote control lines all enter the aircraft at one point without breaking the streamlining of the aircraft fuselage.

The above and other objects and features of the invention will appear from the following description with reference to the drawings, in which:

Figure 1 is a pictorial representation partly in section of a model aircraft embodying the present invention, the figure being partly broken away to show the internal parts, Figure 2 is a rear elevation of part of the control mechanism of the aircraft, Figure 3 is a section on line 3—3 of Figure 2, Figure 4 is a sectional pictorial elevation of the main control mechanism of the aircraft, Figure 5 is a detail representation of the aileron control mechanism illustrated in Figure 1, to an enlarged scale.

Referring now to the drawings, in Figure 1 a model aircraft is designated generally by the numeral 10. This aircraft is of conventional configuration, having port and starboard wings 11 and 12 respectively, a tail plane 13, a vertical fin 14 and conventional control surfaces on each of these members. An engine 15 of conventional type is used to power the aircraft. Control lines 16, 17 and 18 control the aircraft and line 19 serves as a stabilizing line. A bar-like member 52 forked as illustrated extends from the ring 51 along the stabilizing line 19 for a distance roughly equivalent to the span of the wing to hold the plane in a fixed attitude determined according to the slot in the ring 51 engaged by a catch 53 as is hereinafter more fully described. A secondary action of the member 52 is to prevent the propeller or the wing becoming tangled with the line 19. An operator's handle 20 is attached to control lines 16 and 18 and the line 17 passes through the handle 20 and terminates in a control ring 66. A bar 21 associated with the control lines is positioned between the handle 20 and the aircraft for the purpose of anchoring the stabilizing line 19 which is connected to the bar 21 substantially midway between its ends. In effect the bar 21 is anchored by the control lines 16 and 18 which are connected to it at opposite ends which may, if desired, be formed in two sections, one extending from the handle 20 to the bar 21 and the other from the bar 21 to the aircraft. Since the line 17 operates independently of the lines 16 and 18, it passes through the bar 21. Control lines 16, 17 and 18 lead to the rear of the aircraft and into the fuselage 22 via a guide means 9.

The guide means 9 comprises a tubular member 23 (see Figure 4) extending fore and aft through the aircraft fuselage and journalled at 25 in the aircraft tail, a pulley system 16A, 17A and 18A attached to the tubular means in a manner hereinafter described, and means to prevent the tubular member and pulley system from rotating with the aircraft. The tubular member is split axially and opened to form a fork-like portion 8 between the arms of which the pulley system 16A, 17A and 18A is mounted on a transverse axle 24. A stiff wire member 23A attached to the fork-like portion 8 extends outwardly therefrom and terminates in a guide lug 65 through which the control lines 16, 17 and 18 pass; the member 23A and the lug 65 spacing the lines 16, 17 and 18 and guiding them to the pulleys 16A, 17A and 18A whereby the lines may prevent the guide means from rotating with the aircraft without pulling the lines from the pulleys.

Within the fuselage of the aircraft is a gimbal-like construction comprising a ring-like member 26 and a ring 29. This ring-like member 26 is arranged to pivot about a transverse diametrical axis within the fuselage 22 on pivot pins 27 and 28, mounted in bearings (not shown) in the longitudinal stringers of the aircraft, and the second or intermediate ring member 29, is arranged to pivot on pivot pins 30A and 31A on a diametrical axis, and is mounted in bearings 30 and 31 in the ring 26. These bearings are diametrically opposed and are displaced 90° from the pivot pins 27 and 28 about the periphery of the ring 26. A further ring member 32 is rotatably mounted within the ring 29, and is coaxial with it. As illustrated, ball bearings 68 are provided between these rings 29 and 32, but any form of similar bearing may be used.

The inner ring 32 is pivotally attached by pivot pins 33 which are attached to plate 34, this plate being attached to the tubular member 23. The plate 34 is arranged to pivot transversely of the tubular member 23 about a pivot 6 and its pivotal position is adjusted manually and is fixed by a set screw 35 sliding in an arcuate slot 35A. Intermediate ring 29 is provided with a lug 44 to which is connected a stiff wire control member 48 having its other end connected to a horn 45 on the rudder control surface 46. Tilting of the pins 33 relative to the tubular member 23 by adjustment of the plate 34 and consequent tilting of the gimbal-like construction about pins 27, 28, adjusts the rudder control surface 46 which may thus be set at a desired angle by loosening the set screw 35 shifting the plate 34 to the desired position and resetting the set screw 35.

The rings 29 and 32 are pivoted by the movement of the control lines 16 and 18 which pass out of the tubular member 23 through slots 38 and are connected respectively to lugs 39 and 40 connected to the ring 32 at diametrical opposite points which are substantially 90° from the pivot pins 33. The elevator control surfaces 43 are actuated through a horn 42 by a stiff wire control member 47 connected to a lug 41 which like the lug 44 is connected to the ring 29 but is spaced therefrom by substantially 90°. It will be seen that if the rings 29 and 32 are pivoted on the pins 30A and 31A, when the rings are in the setting shown in Figure 4, the elevator control surfaces 43 are operated due to the "pull or push" effect transmitted by the member 47. The control members 48 and 47 are suitably mounted at 44, 45, and 41, 42 to allow swivel movement of the ends of the control members 47, 48 relative to the lugs and horns.

Assuming then that the craft is in level flight, movement of the control handle 20 operates the control lines 16 and 18 so as to pivot the rings 29 and 32 and thereby operate the elevator control surfaces 43 to cause the craft to climb or dive; also this is so, regardless of whether the plane is right side up or upside down. Since the lug 44 is connected to the ring 29 in line with the pivot pins 30A and 31A, the rudder 46 is unaffected by such pivoting of the rings 29 and 32. As the craft rotates about its directional axis (i. e. rolls), however, and carries the rings 26 and 29 with it, the rings 26 and 29 are rotated on the balls 68 in relation to the inner ring 32 and the tubular member 23. When the rings 26 and 29 have thus been displaced through 90° from the position shown in Figure 4, the lug 44 occupies a position in a plane normal to the plane of the plate 34 and the pivot pins 30A and 31A are aligned with the lugs 39 and 40, so that actuation of the lines 16 and 18 to pivot inner ring 32 causes the three rings 26, 29 and 32 to pivot on the pins 27 and 28 whereby the control movements of the lines 16 and 18 is transferred to the control member 48 and to the rudder control surface 46 which in this position of the aircraft is an altitudinal control surface. At the same time the preset tilt on the plate 34 acts not on the control member 48 but on the control member 47, since it too has moved through 90°, thus transferring the original set of the lateral directional control surface to the control surfaces 43 which in this position act as lateral control surfaces. It will be seen therefore, that as the craft rotates through 90° from the upright position, the movements of the control lines 16 and 18 are progressively shifted from one to the other of the control members 47 and 48, and as the craft continues to roll through a further 90° the reverse action takes place. It will be seen that when the aircraft is in the inverted (upside down) position, the pivoting of the inner ring 32 acts on the control member 47 without interfering with the control member 48 exactly as when the craft is right side up, except that the lug 41 is now on the same side of ring 32 at the lug 39 and the control surface 43 is moved to the dive position by pulling on the control lines 16 just as was the case when the craft was in the upright position i. e. by the same movement of the handle 20. Thus, there is no need for the operator to compensate for the fact that the craft is upside down.

The third control line 17 passes over pulley 17A and through the tubular member 23, and, as illustrated in Figure 1 passes straight through the aircraft to the forward bearing 49. This bearing as illustrated in Figures 2 and 3 comprises an outer ring 50 and an inner ring 51 connected by balls in the manner of a ball race. The ring 50 is secured to the fuselage 22 of the aircraft, and the ring 51, which is rotatable relative to the aircraft, is secured to the stabilizing line 19. The control line 17 is attached at 53 (Figure 3) through a swivel 57 to a spring loaded catch 54 which normally engages one of a series of slots 55, 56, 69 and 70 (Figure 2) cut in the ring 51. On operation of the control line 17, the spring loaded catch 54 is withdrawn from the slot in which it is engaged whereupon the craft is free to roll about the tube 23 and if the control line 17 is released by the operator, the catch 54 will automatically engage in the next slot, thus halting the roll or rotation of the craft. The four slots 55, 56, 69 and 70 and further similar slots may be positioned as desired.

As will be seen in Figure 5, the line 17 is also used for control of the ailerons 11A and 12A. An aileron actuating linkage comprises rods 58 and 59 attached to rod 60A fixed on the line 17 and sliding in a fixed sleeve 60. The rods 58 and 59 are pivotally connected to rods 61 and 62 which operate stiff wires 63 and 64, on which the ailerons 11A and 12A are mounted.

When rod 58 is pushed away by the rod 60A in the direction of the arrows, it causes rod 62 to rotate about point 164 causing stiff wire 64 to be twisted thus rotating the aileron 12A in the direction of the arrow. The linkage 59, 61 acting similarly causes the stiff wire 63 to be twisted in the opposite direction, to rotate the aileron 11A accordingly.

This arrangement insures that movement of the line 17 causes the ailerons 11A and 12A to move in opposite directions to each other. Thus when the operator draws back on the control line 17, the ailerons are moved to initiate a roll at the same time as the catch 54 is withdrawn from the slot, in which it is engaged, so as to permit the aircraft to roll. Spring 54A (Figure 3) urges the catch into the locking position in the slot so that on release of the control line 17 the ailerons return to their normal position and the rolling ceases.

What I claim as my invention is:

1. A control line model aircraft capable of rotating about its directional axis, comprising propulsive means, altitudinal and directional control surfaces, remote control elements, means adapted to actuate said control surfaces and to shift movements of said remote control elements from altitudinal to directional control surfaces and vice versa as the aircraft rotates about its directional axis accomplishing a complete shift of control when the aircraft has rotated through substantially 90°, ailerons, actuating means connecting said ailerons with said remote control elements, and releasable lock means operable by said remote control elements and adapted to lock the aircraft in one of a number of pre-selected attitudes of rotation about its directional axis and to render the ailerons inoperative until the lock is released.

2. A control line model aircraft capable of rotating about its directional axis, comprising propulsive means, altitudinal and directional control surfaces, remote control elements, means adapted to actuate a control surface as a directional control surface, and to actuate a control surface as an altitudinal control surface, said actuating means also being adapted to shift movement of said remote control elements from altitudinal to directional control and vice versa as the aircraft rotates about its directional axis accomplishing a complete shift of control when the aircraft has rotated through substantially 90°, ailerons, actuating means connecting said ailerons with said remote control elements, and releasable lock means operable by said remote control elements and adapted to lock the aircraft in one of a number of pre-selected attitudes of rotation about its directional axis and to render the ailerons inoperative until the lock is released.

3. A control line model aircraft as claimed in claim 1 in which the said releasable lock means comprises an outer ring secured to the aircraft frame and positioned concentrically of the directional axis thereof, an inner ring located concentrically within said outer ring, bearing means between inner and outer rings to permit relative rotation therebetween, indexing apertures angularly spaced apart on said inner ring, and latch means adapted to rotate with said outer ring relative to said inner ring and biased normally to engage one of said indexing apertures and operatively connected to said remote control elements.

4. A control model aircraft as claimed in claim 1 wherein said remote control elements comprises a handle, a remote control line attached to each end of said handle and extending outwardly therefrom to said means adapted to actuate said directional and altitudinal control surfaces, an aileron remote control line located centrally of said handle and passing therethrough, and adapted to operatively engage said aileron actuating means and said lock means.

5. A control model aircraft as claimed in claim 1 in which the said releasable lock means comprises an outer ring secured to the aircraft frame and positioned concentrically of the directional axis thereof, an inner ring located concentrically within said outer ring, bearing means between inner and outer rings to permit relative rotation therebetween, indexing slots disposed radially about the face of said inner ring in spaced apart relationship, an operator's stabilizing line, anchoring means connected to said inner ring and to the operator's stabilizing line, latch means secured to said outer ring and biased normally to engage one of said indexing slots and operatively connected to said remote control elements.

6. A control line model aircraft as claimed in claim 5, in which said outer and inner rings are located at the nose of said aircraft and said anchoring means comprises a forked element located outside the aircraft and connected at the tips of its forks to said inner ring and at its end remote from said forks with said operator's stabilizing line.

7. A control line model aircraft as claimed in claim 6 wherein said bearing means comprises a ball bearing connection arranged between the inner and outer rings in the manner of a ball race; and in which the said indexing slots are on the side of the inner ring facing the aircraft tail.

8. A control line model aircraft capable of rotating about its directional axis comprising propulsive means, altitudinal and directional control surfaces, ailerons, means adapted to actuate said altitudinal and directional control surfaces and to shift movements of said remote control elements from altitudinal to directional control surfaces and vice versa as the aircraft rotates about its directional axis accomplishing a complete shift of control when the aircraft has rotated through substantially 90°, said remote control elements including remote control lines for aileron actuation and for altitudinal and directional control surface actuation, a bar member connected to the remote control lines and adapted to space them apart, said bar member being positioned on the remote control lines at a point between the operator and the aircraft tail, a tubular member extending along the directional axis of the aircraft and protruding rearwardly of the tail thereof and extending within the aircraft fuselage to a point close to the center of the wing root of the aircraft, guide means including a pulley system operatively connected to the tubular member at a point beyond the aircraft tail, said guide means introducing said remote control lines into the tubular member, releasable lock means located near the nose of the aircraft operable by said remote control line for aileron actuation and adapted to lock the aircraft in one of a number of pre-selected attitudes of rotation about its directional axis, and to render the ailerons inoperative until the lock is released, and stabilizing means located outside the aircraft, said stabilizing means including a forked member attached at the fork tips to the lock means, and at the end remote from the fork tips to a stabilizing line, said stabilizing line connecting the forked element to the said spacing bar whereby actuation of one of the remote control lines releases said lock means and operates said ailerons, thus permitting the aircraft to rotate about the said tubular element.

9. A control line model aircraft as claimed in claim 6, in which said means adapted to actuate said control surfaces and to shift movements of said remote control elements from altitudinal to directional control surfaces and vice versa comprises a gimbal assembly having a pair of gimbal rings arranged concentrically for relative rotation one within the other, means adapted to permit the gimbal assembly to move angularly as a whole about an axis lying in a plane which is vertical when the aircraft is flying straight and level, a pair of members located diametrically opposite each other on said inner ring securing the ends of the said altitudinal and directional control lines, and control line movement transmitting means connecting the altitudinal and directional control surfaces to the outer ring of the gimbal assembly at points spaced apart by substantially 90° thereon.

10. A control line model aircraft as claimed in claim 9 further comprising a second gimbal ring arranged uniformly about said gimbal assembly, said second gimbal ring being adapted to tilt fore and aft about an axis laterally transverse to the directional axis, a tubular member extending along the directional axis of the aircraft within the fuselage thereof to a point close to the centre of the wing root of the aircraft and rearwardly outside the tail of the aircraft, a plate member extending fore and aft within the aircraft aong the side of said tubular member and pivotally attached near one end thereto, a slotted arcuate cam surface near the other end of said plate member adapted to engage a projection on said tubular member, means to lock said plate member at a selected setting relative to the tubular member within the range of said slotted arcuate cam surface, and pivot pins located in a plane which is vertical when the aircraft is flying straight and level connecting the inner ring of said gimbal assembly with said plate member and connecting said outer ring of said gimbal assembly with said second gimbal ring whereby the directional control surface can be pre-set to cause the aircraft to tend to fly out of its circular flight path without interfering with the normal control of the aircraft.

References Cited in the file of this patent

UNITED STATES PATENTS

| | | |
|---|---|---|
| 2,559,049 | St. Clair | July 3, 1951 |
| 2,595,650 | Eppler | May 6, 1952 |
| 2,624,152 | Sneed | Jan. 6, 1953 |
| 2,659,999 | Turner | Nov. 24, 1953 |
| 2,736,133 | Carpenter | Feb. 28, 1956 |